United States Patent [19]

Mueller et al.

[11] Patent Number: 4,736,372
[45] Date of Patent: Apr. 5, 1988

[54] METHOD AND APPARATUS OF TRANSMISSION FOR A DIGITAL SIGNAL

[75] Inventors: Martin Mueller, Munich; Theodor Schwierz, Aichach, both of Fed. Rep. of Germany

[73] Assignee: Siemens Aktiengesellschaft, Berlin and Munich, Fed. Rep. of Germany

[21] Appl. No.: 905,894

[22] Filed: Sep. 10, 1986

[30] Foreign Application Priority Data

Sep. 13, 1985 [DE] Fed. Rep. of Germany ....... 3532793

[51] Int. Cl.⁴ .............................................. H04J 3/07
[52] U.S. Cl. ................................. 370/102; 370/110.1
[58] Field of Search ..................... 370/102, 106, 110.1; 375/112, 114

[56] References Cited

U.S. PATENT DOCUMENTS

| | | | |
|---|---|---|---|
| 3,987,248 | 10/1976 | Platet et al. | 370/102 |
| 4,002,844 | 1/1977 | Doussoux | 370/102 |
| 4,072,826 | 2/1978 | Aveneau | 370/102 |
| 4,247,937 | 1/1981 | Paesler | 370/102 |
| 4,397,017 | 8/1983 | Rokugo | 370/102 |
| 4,489,421 | 12/1984 | Burger | 375/112 |
| 4,667,324 | 5/1987 | Graves | 375/112 |
| 4,669,080 | 5/1987 | Aueneau et al. | 375/112 |

OTHER PUBLICATIONS

Hans Marko and Harro Lothar Hartmann; "Nachrichtentechnische Fachberichte"; Oct. 11-14, 1971; pp. 245-256.
Friedrich Kuehne and Karl Lang; "Positive Zero Negative Justification Technique for the Multiplex Transmission of Plesiochronous . . . "; Frequenz, vol. 32/1978; pp. 281-287.

*Primary Examiner*—Salvatore Cangialosi
*Attorney, Agent, or Firm*—Lawrence C. Edelman

[57] ABSTRACT

In a method of transmitting digital signals using so-called pulse stuffing, in which plesiochronous (nearly-synchronous) data signals are transmitted in a main channel of a sum signal channel as synchronous data and in an auxiliary channel of a sum signal channel as additionl data together with stuffing data, it is proposed that the stuffing data should consist of phase words which contain, in digital form, the phase relationship between the sum signal and the plesiochronous data signals.

5 Claims, 1 Drawing Sheet

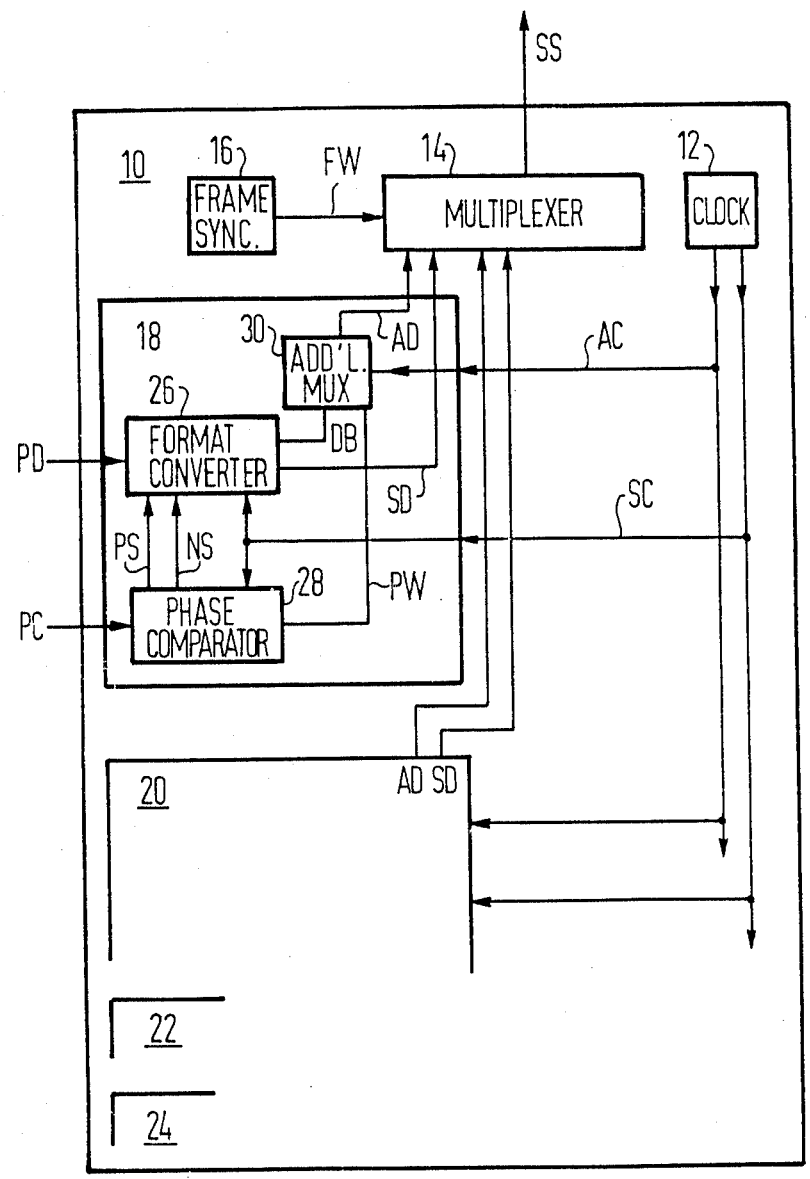

METHOD AND APPARATUS OF TRANSMISSION FOR A DIGITAL SIGNAL

BACKGROUND OF THE INVENTION

1. Field of the Invention

The invention relates to a method and apparatus for transmitting digital signals and in particular to signal multiplexing techniques employing pulse stuffing.

2. Description of the Prior Art

A digital signal multiplex device of the type described in an aritcle of the German magazine "Frequenz", 32 (1978) 10, pages 281-287, entitled Positive-Zero-Negative Stuffing Technique for Multiplex Transmission of Plesiochronous Data Signals, combines a plurality of individual digital signals of a given hierarchy stage to form a digital signal of the next higher hierarchy stage. The bit rates and the pulse frames of the digital signals of the individual hierarchy stages are laid down by international agreements. At all levels, the transmission takes place plesiochronously (nearly-synchronously). As used herein, the term "plesiochronous digital signal" means a digital signal having a bit rate which can exceed or fall below its nominal bit rate by a maximum of one tolerance value. The relative tolerances are likewise laid down. An n-channel multiplex device for n-plesiochronous data signals consists of a multiplexer which combines the n-digital signals to form a multiplex signal, and of a demultiplexer which separates the multiplex signal into n-digital signals. The method whereby the bit rates of the plesiochronous digital signals are matched to the bit rate of the multiplex signal is known as pulse stuffing (or justification). A known method in this context is the positive-zero-negative stuffing method corresponding to the United Nations established International Telephone and Telephony Consultative Committee (C.C.I.T.T.) recommendation G.702.

A multiplex device for plesiochronous digital signals consists of clock rate matching units which are individually assigned to each of the plesiochronous channels and of a synchronous multiplexer. The synchronous multiplexer makes available to each of the plesiochronous channels two synchronous channels for the transmission of the digital signals, a main channel, and an auxiliary channel having a very much lower bit rate. The bit rate of the main and auxiliary channels are in a fixed rational ratio to the bit rate of the multiplex channel.

In the case of positive stuffing, the value of the bit rate of the digital signals in the plesiochronous channels is lower than the value of the bit rate of the main channel. The clock rate matching unit of a channel transfers the digital signal in question, bit by bit, to the associated main channel until a phase difference corresponding to the period of one bit has been reached as a result of the difference between the bit rates. Then, at a suitable point in time, the clock rate matching unit inserts a blank bit, the so-called stuffing bit, into the digital signal. At the same time the clock rate matching unit transmits an item of stuffing information via the auxiliary channel. The item of stuffing information indicates the point at which the stuffing bit is inserted.

In the case of negative stuffing, the value of the bit rate of the digital signals in the plesiochronous channels is greater than the value of the bit rate of the main channel. In this case, at a suitable point in time in the multiplexer, an information bit is extracted from the digital signal and is transmitted via the auxiliary channel together with the stuffing information. In the demultiplexer this information bit is re-inserted into the digital signal at the appropriate position in accordance with the stuffing information.

The fundamental construction of multiplex devices, in particular the transmitter, is described in an article entitled "Multiplexer for 8.448 Mbit/s in a Positive-Negative Stuffing Technology" by U Assmus et al. published in the German magazine "Nachrichtentechnischen Fachberichten", 42 (1972), page 245-256 incorporated herein by reference for illustrating the state of the art. In a central cocmponent, the transmitter contains a clock generator for the generation of the multiplex frequency and devices for frame generation and nesting. Individually in respect of each channel, each input system is assigned a phase comparator, a format converter, and a circuit for the selection of the necessary clock rate matching information. The frame generating device emits frame words on the basis of which the sum signal emitted from the multiplexer acquires a frame structure.

In these known methods the stuffing command or stuffing information is transmitted via the auxiliary channel. An unrecognized stuffing command leads to the repetition or loss of a bit at the receiving end. Therefore, an unrecognized stuffing command results in a longer shift of the data by one bit and in a corresponding series of faults. When a stuffing command remains unrecognized because of adulterated transmission, the loss of synchronism of the data can be recognized only on the basis of the shift of the frame word.

U.S. Pat. No. 4,489,421 issued to Erich Burger on Dec. 18, 1984 discloses a digital communications transmission system in which, at the transmitting end, two plesiochronous data signals, including additional or auxiliary signals thereof, are combined to form a multiplex signal or sum signal. One of the additional signals contains the instantaneous phase relationship between the two plesiochronous bit repetition frequencies of the data signals as binary phase words. The phase relationship, as transmitted by the binary phase words, is used to regenerate the plesiochronous clock signal at the receiving end of the transmission link. Although it is in fact known to transmit phase words; these phase words are not used as stuffing information. The repetition frequency of the phase words in additional channel is not selected to be sufficiently high that stuffing commands can be derived therefrom. It is noted that in postal networks, re-synchronization takes place relatively rapidly but not in networks in which encoded transmission is used, in which case re-synchronization takes place much slower.

SUMMARY OF THE INVENTION

An object of the invention is to provide a stuffing method whereby long series of faults in a case of adulterated transmission can be avoided.

A further object of the invention is to avoid the loss of synchronism between the transmitting and receiving ends. These objects, as well as other objects which will become apparent from the disclosure that follows, are realized in accordance with the invention by transmitting digital signals using pulse stuffing, wherein a plurality of input channels containing plesiochronous data are combined with synchronizing information to form a sum signal channel and wherein, in accordance with the pulse stuffing, the plesiochronous data is transmitted in a main channel as synchronous data and is transmitted in an auxiliary channel of the sum signal channel as additional data together with stuffing data. The stuffing data consists exclusively of phase words which contain, in digital form, the instantaneous phase relationship between the sum signal and the plesiochronous data, and the repetition frequency of the phase words is such that two consecutive phase words can differ at the most by their least significant bit.

In a further aspect of the invention, the highest value bit of the phase word is multiplicately transmitted. This measure serves to increase the freedom from interference.

These and other features and advantages of the invention will be apparent from the following description of the preferred embodiments, and from the claims.

For a full understanding of the present invention, reference should now be made to the detailed description of the preferred embodiment of the invention and its accompanying drawing.

BRIEF DESCRIPTION OF THE DRAWING

The sole FIGURE illustrates the transmitting section of a multiplexer constructed in accordance with the principles of the invention.

DETAILED DESCRIPTION OF THE PREFERRED EMBODIMENT

In the FIGURE, multiplex device 10 comprises, as central elements, a clock signal generator 12, the actual multiplexer 14, and a frame synchronizing unit 16. Multiplex device 10 also contains a matching circuit 18, and further matching circuits 20, 22 and 24, where all of matching circuits 18–24 are of identical construction.

Matching circuit 18 comprises a format converter 26 to which a plesiochronous data signal PD is applied, a phase comparator 28 to which a plesiochronous clock signal PC is applied and an additional multiplexer 30.

An additional clock signal AC, emitted from clock signal generator 12, is supplied to the additional multiplexers 30 of matching circuits 18–24 and a synchronous clock signal SC, likewise emitted from clock signal generator 12, is applied to format converters 26 and phase comparators 28 of matching circuits 18–24.

In addition to the usual circuit arrangement, phase comparator 28 contains the circuit arrangement disclosed in FIG. 1 and its associated description in the forenoted U.S. Pat. No. 4,489,421, incorporated herein by reference. Phase comparator 28 produces a digital phase word PW whose value corresponds to the phase difference between the plesiochronous clock signal PC and the synchronous clock signal SC. The phase word PW is transfered in serial form from phase comparator 28 to additional multiplexer 30. In addition, phase comparator 28 emits a positive stuffing signal PS or a negative stuffing signal NS in a manner known per se to format converter 26, see, for example, the magazine "Frequenz", FIG. 4 and page 284, refered to in the Background of the Invention and incorporated herein by reference to show the state of the art.

Via matching circuit 18, and more particularly via format converter 26, a sychronous data signal SD is produced bit-wise from the plesiochronous data signal PD. For this purpose, format converter 26 basically contains a buffer store into which the plesiochronous data signal PD is written bit-wise in accordance with the timing of the plesiochronous clock signal PC, and from which these bits are read out in accordance with the timing of the synchronous clock signal SC. The readout bits comprise the synchronous data signal SD and are fed to multiplexer 14. When the phase difference reached between the plesiochronous data signal PD and the synchronous data signal SD corresponds to the period of one bit, depending upon whether the bit rate of the plesiochronous data signal PD is lower or higher than that of the synchronous data signal SD, then either a blank (i.e., stuffing bit) is inserted into the bit sequence of the synchronous data signal SD or else a data bit DB is extracted and is fed to additional multiplexer 30.

In the arrangement as described so far, during short periodic intervals, the phase difference between the plesiochronous clock signal PD and the synchronous clock signal SD is measured by phase comparator 28 and the generated phase words PW are transferred in serial form to additional multiplexer 30. In the case of positive stuffing, the clock frequency of the synchronous clock signal SC is greater than that of the plesiochronous clock signal PC. In this case, the phase words PW are cyclical and pass step-wise in ascending order through all the values from 00 ... to 11 ... (here the digits 0 and 1 appear n times). After reaching 11 ... the phase word PW jumps to 00 ... . The jump is positioned to be such that simultaneously therewith, because of the phase difference reached between the plesiochronous data signal PD and the synchronous data signal SD, a blank bit must be inserted into the synchronous data signal SD.

In the case of negative stuffing the value range of the phase word PW is passed step-wise through all values from 11 ... to 00 ... in descending order. The jump from 00 ... to 11 ... indicates that a data bit DB must be extracted from the plesiochronous data signal PD.

Multiplexer 14 is supplied, via additional multiplexer 30, with items of additional data AD which contain —likewise in nested form —the phase word PW and the data bit DB, extracted where necessary from the plesiochronous data signal PD. The jumps of the phase word PW from 11 ... to 00 ... and from 00 ... to 11 ... represents the commands for positive stuffing and negative stuffing, respectively, and can be analyzed in a receiving component (not shown) of an appropriate multiplex device.

From the synchronous data SD and the additional data AD of matching circuits 18–24, and from a frame word FW emitted from frame synchronising unit 16, multiplexer 14 forms a sum signal SS of the type described in the forenoted "Frequenz" article. Sum signal SS consists of consective pulse frames, each frame beginning with a frame word FM, and is transferred, for example via a radio relay link, to the receiving component of a multiplex device.

In accordance with the invention, in sum signal SS, the phase word PW is transmitted at a sufficiently high enough repetition frequency, and with values graduated fine enough, to ensure that two consecutive phase words PW differ at the most by their least significant bit. This ensures that the repetition frequency of the stuffing commands is low in comparison to the repetition frequency of the phase words PW. A stuffing command (positive or negative) which has initially failed to be recognized and has been mutilated in transmission —i.e. the transition of the phase word PW from the value 00 .. 00 to value 11 .. 11 and vice versa, can nevertheless be recognized in the transition of the phase words PW from the value 00 .. 00 to value 11 .. 10 and from the value 11 .. 11 to the value 00 .. 01. In this way, a long series of faults in the data signal bits is safely avoided.

In order to guarantee a high level of transmission security, the most significant bit of the phase word PW is additionally multiplicately transmitted.

For example, if the phase word PW consists of 4 bits, the most significant bit is transmitted three times, resulting in the transmission of 6 bit phase words.

There has thus been shown and described a novel method and apparatus for producing a multiplex digital signal which fulfills all the objects and advantages sought therefore. Many changes, modifications, variations and other uses and applications of the subject invention will, however, become apparent to those skilled in the art after considering this specification and its accompanying drawing which disclose a preferred embodiment thereof. All such changes, modifications, variations and other uses and applications which do not depart from the spirit and scope of the invention are deemed to be covered by the invention which is limited only by the following claims.

What is claimed is:

1. A method of transmitting digital signals using pulse stuffing techniques, wherein a plurality of input channels containing plesiochronous data are combined with synchronizing information to form a sum signal channel and wherein, in accordance with the pulse stuffing, the plesiochronous data is transmitted in a main channel as synchronous data and is transmitted in an auxiliary channel of the sum signal channel as additional data together with stuffing data, comprising:

causing said stuffing data to consist exclusively of phase words which contain, in digital form, the instantaneous phase relationship between the sum signal and the plesiochronous data; and selecting the repetition frequency of the phase words in the sum signal channel and the number of distinct values which said phase words can represent, to be such that two consecutive phase words transmitted in said sum channel can differ at the most be their least significant bit.

2. The method as claimed in claim 1, comprising: multiplicatively transmitting the most significant bit of the phase word.

3. In a system for transmitting digital signals using pulse stuffing, wherein a plurality of input channels containing plesiochronous data signals are combined with synchronizing information to form a sum signal channel and wherein, in accordance with the pulse stuffing, the plesiochronous data is transmitted in a main channel as synchronous data and is transmitted in an auxiliary channel of the sum signal channel as additional data together with stuffing data, a circuit arrangement for carrying out said pulse stuffing, comprising:

a multiplexer;

a plurality of channel-individual matching circuits, each including a format converter which converts a respective one of the plesiochronous data signals into a synchronous data signal and, each including a phase comparator in which stuffing commands are generated; and wherein said phase comparators are designed to be such that they produce phase words which contain in digital form the instantaneous phase relationship between said sum signal and said plesiochronous data signals, said phase words having a repetition frequency and number of distinct values which it can represent such that two consecutive phase words can differ at most by their least significant bit, and wherein each of said matching circuits contain an additional multiplexer which combines the data bits extracted by the format converter, with the phase words, to form additional data which it transfers to the multiplexer.

4. The circuit arrangement as claimed in claim 3, wherein:

said phase comparators are designed to be such that they multiplicatively emit the most significant bit of each phase word.

5. The circuit arrangement as claimed in claim 4, wherein:

said phase comparators emit the most significant bit of each phase word three times, where each phase word consits of six bits with a value graduation of $2^4$.

* * * * *